US012651242B2

(12) United States Patent
Duan-Porter et al.

(10) Patent No.: US 12,651,242 B2
(45) Date of Patent: Jun. 9, 2026

(54) POINT-OF-SALE TRANSACTION SUSPENSION SYSTEM

(71) Applicant: TOSHIBA GLOBAL COMMERCE SOLUTIONS, INC., Durham, NC (US)

(72) Inventors: Benjamin Z. Duan-Porter, Eden Prairie, MN (US); Phillip Monkowski, Apex, NC (US); Sarath babu Raja Surya, Raleigh, NC (US); John M. Wendler, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 193 days.

(21) Appl. No.: 18/409,577

(22) Filed: Jan. 10, 2024

(65) Prior Publication Data

US 2025/0225497 A1 Jul. 10, 2025

(51) Int. Cl.
G06Q 20/20 (2012.01)

(52) U.S. Cl.
CPC ......... G06Q 20/206 (2013.01); G06Q 20/202 (2013.01)

(58) Field of Classification Search
CPC ........................... G06Q 20/206; G06Q 20/202
USPC ......................................................... 705/18
See application file for complete search history.

(56) References Cited

U.S. PATENT DOCUMENTS

2021/0365950 A1* 11/2021 Waughtal ............. G06Q 20/202
2022/0107855 A1* 4/2022 Goodsitt ............... G06Q 20/20

OTHER PUBLICATIONS

Bauer, Eric et al. Service Reliability and Service Availability. Wiley—IEEE Press 2012, 2012. (Year: 2012).*

* cited by examiner

*Primary Examiner* — Fawaad Haider
(74) *Attorney, Agent, or Firm* — Patterson + Sheridan, LLP; Gero G. McClellan

(57) ABSTRACT

Method and apparatus for enhanced emergency response are provided. An activation signal indicating an event has occurred at a first location is received. An alert is transmitted to a set of transaction processing devices at the first location, where the alert instructs each respective transaction processing device, from the set of transaction processing devices, to suspend respective transactions that are pending for completion. A deactivation signal indicating the event was resolved is received. Responsive to receiving the deactivation signal, diagnostic checks are conducted on each of the set of transaction processing devices to determine operational status. A transaction processing device, from the set of transaction processing devices, is determined to be operational. Responsive to determining the transaction processing device is operational, the transaction processing device is instructed to resume the respective transactions suspended on the transaction processing device.

17 Claims, 6 Drawing Sheets

400

405 RECEIVE EMERGENCY ALERT

410 IMPLEMENT PROTECTIVE ACTIONS

415 REQUEST FOR DIAGNOSTIC CHECK RECEIVED?

NO

YES

420 PERFORM OPERATIONAL STATUS CHECK

425 REPORT CHECK RESULT(S)

430 RECEIVE FOLLOW UP INSTRUCTION(S)

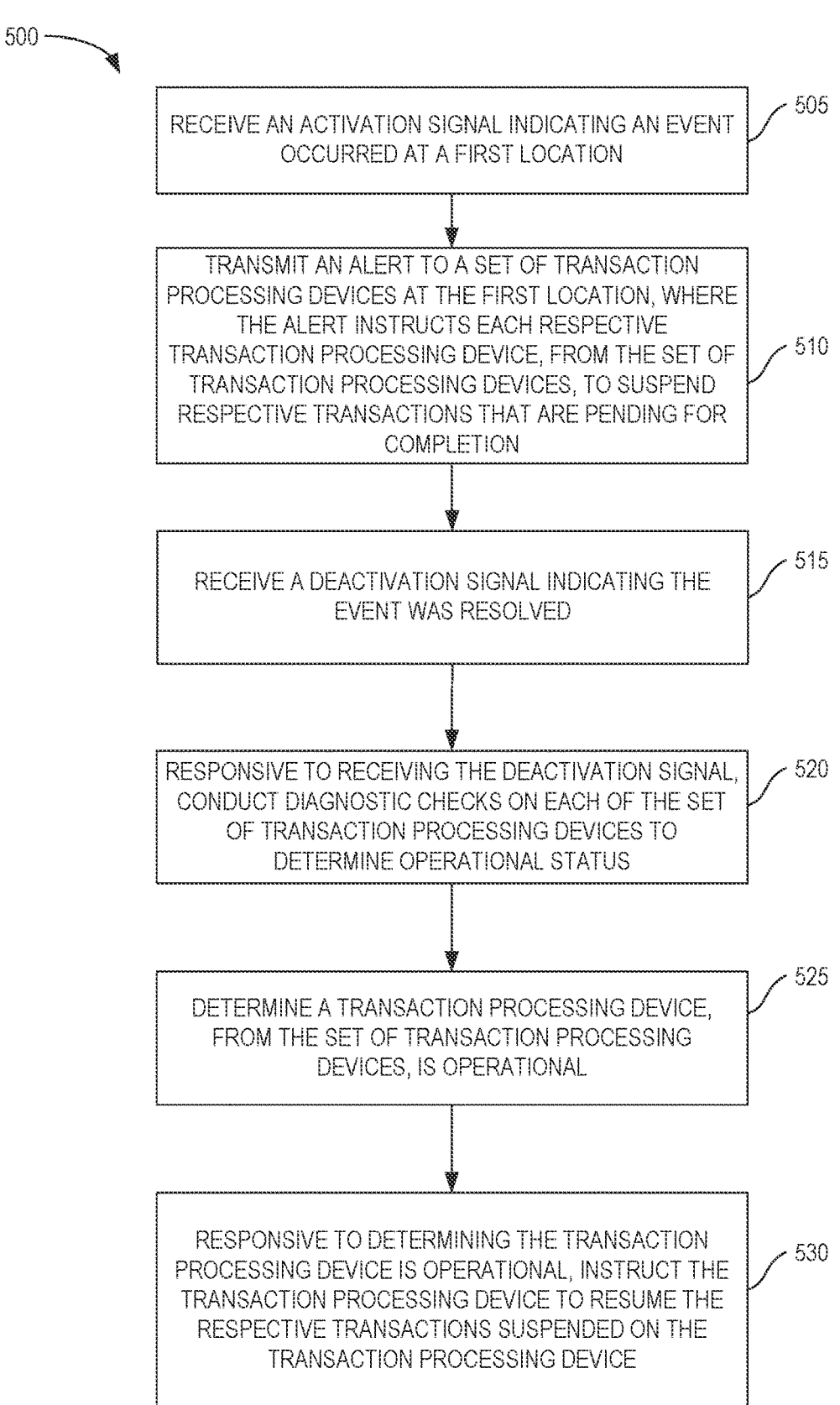

500

505 — RECEIVE AN ACTIVATION SIGNAL INDICATING AN EVENT OCCURRED AT A FIRST LOCATION

510 — TRANSMIT AN ALERT TO A SET OF TRANSACTION PROCESSING DEVICES AT THE FIRST LOCATION, WHERE THE ALERT INSTRUCTS EACH RESPECTIVE TRANSACTION PROCESSING DEVICE, FROM THE SET OF TRANSACTION PROCESSING DEVICES, TO SUSPEND RESPECTIVE TRANSACTIONS THAT ARE PENDING FOR COMPLETION

515 — RECEIVE A DEACTIVATION SIGNAL INDICATING THE EVENT WAS RESOLVED

520 — RESPONSIVE TO RECEIVING THE DEACTIVATION SIGNAL, CONDUCT DIAGNOSTIC CHECKS ON EACH OF THE SET OF TRANSACTION PROCESSING DEVICES TO DETERMINE OPERATIONAL STATUS

525 — DETERMINE A TRANSACTION PROCESSING DEVICE, FROM THE SET OF TRANSACTION PROCESSING DEVICES, IS OPERATIONAL

530 — RESPONSIVE TO DETERMINING THE TRANSACTION PROCESSING DEVICE IS OPERATIONAL, INSTRUCT THE TRANSACTION PROCESSING DEVICE TO RESUME THE RESPECTIVE TRANSACTIONS SUSPENDED ON THE TRANSACTION PROCESSING DEVICE

FIG. 5

POINT-OF-SALE TRANSACTION SUSPENSION SYSTEM

BACKGROUND

Emergencies such as fires, gas or water leakages, earthquakes, and the like can disrupt normal operations in retail environments. These emergencies not only pose risks to the safety and well-being of customers and staff, but also significantly disrupt transaction procedures at Point of Sale (POS) terminals. For example, during such emergencies, ongoing transactions are often left incomplete as customers and staff must immediately leave the premises. After the emergency has been resolved, the unexpected interruption usually results in unsaved data on these POS terminals. This inability to effectively handle transactions during emergencies not only causes customers to lose track of their intended purchases, thus negatively impacting their shopping experience, but also results in financial losses for business owners.

BRIEF DESCRIPTION OF THE DRAWINGS

FIG. 5 is a flow diagram depicting an example method for transaction suspension and data preservation, according to some embodiments of the present disclosure.

DETAILED DESCRIPTION

Figure 1:
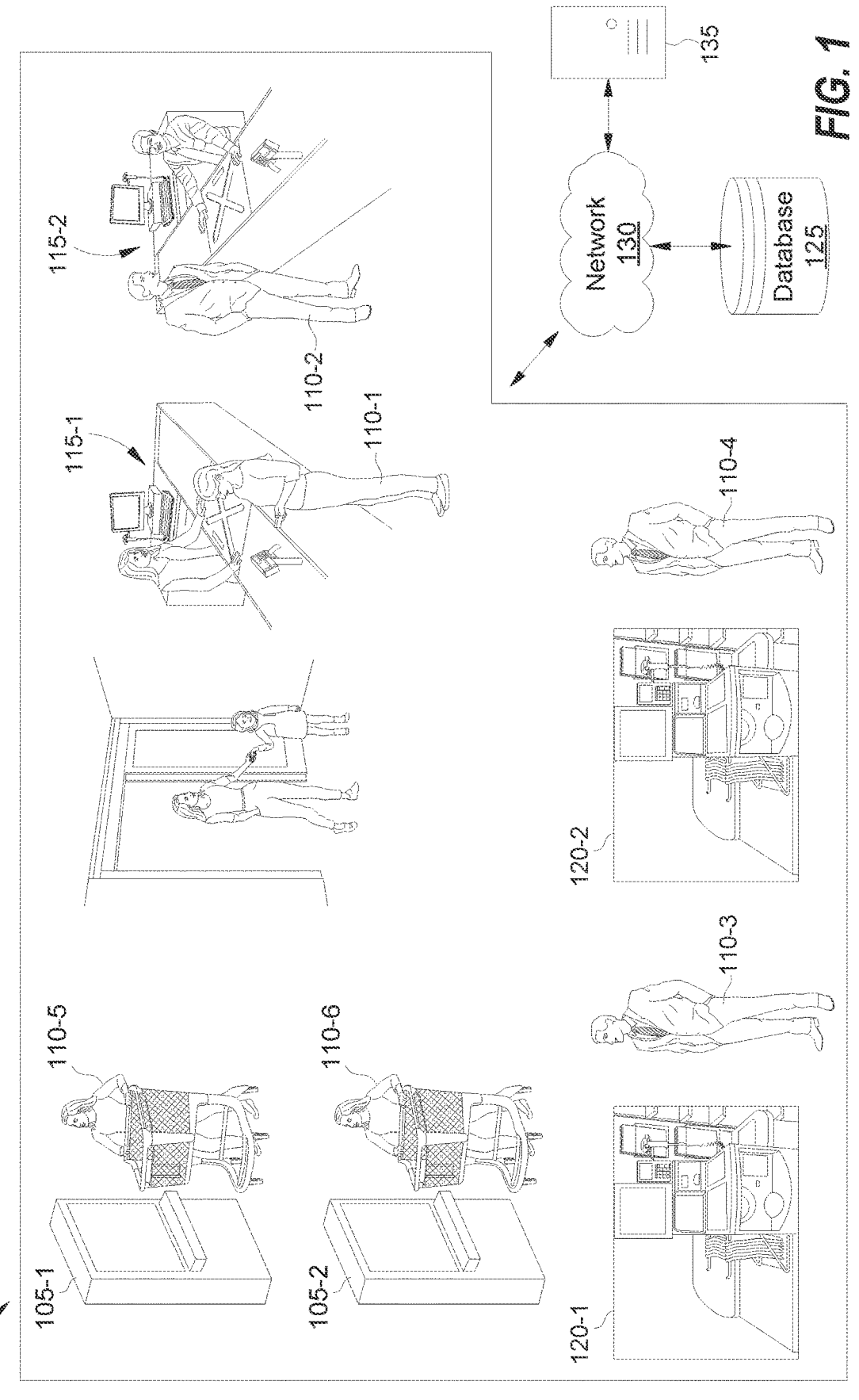
FIG. 1 depicts an example environment for enhanced emergency response, according to some embodiments of the present disclosure.

In at least one example, the present disclosure relates to emergency response, automatically suspending, and securely preserving ongoing transactions upon the detection of an emergency event, and efficiently resuming these suspended transactions on the original or alternative transaction processing devices once the emergency has been resolved.

In some embodiments of the present disclosure, an enterprise site (e.g., a retail establishment) includes one or more transaction processing devices. As used herein, "transaction processing devices" may refer to systems or devices used to conduct and manage checkout transactions and customer interactions. In retail environments, the transaction processing device may refer to POS terminals, including but not limited to staffed checkout devices, self-checkout devices, mobile POS devices, and self-service kiosks.

In some embodiments of the present disclosure, an emergency response system receives an activation signal that indicates the occurrence of an emergency at the enterprise site. In some embodiments, the activation signal may be triggered by an emergency detection system that includes various sensors, monitoring devices, or manual alarm interfaces to detect different types of incidents. For example, the emergency detection system may include the automated sensors for detecting fires, smoke, water or gas leaks, and/or the manual alarm interfaces for reporting incidents like robbery, medical emergencies, unauthorized access, or natural disasters. Upon receiving the activation signal, the disclosed emergency response system issues an emergency alert to one or more transaction processing devices at the enterprise site. In some embodiments, the emergency alert may notify the devices of the emergency and/or include instructions for the devices to perform various actions, such as locking down the devices, suspending ongoing transactions, and preserving transaction data (either locally or by transmitting it to a central database). In some embodiments, the emergency alert may further instruct the devices to print receipts for these suspended transactions as records for future reference.

In some embodiments of the present disclosure, after transmitting the emergency alert, the disclosed emergency response system continues to monitor the environment of the enterprise site by actively listening for further signals from the emergency detection system. Upon receiving a signal indicating the emergency has been resolved, the system performs diagnostic checks on each transaction processing device located at the enterprise site. These checks are intended to determine the operational status of each device. If a device is found to be operational, the system instructs the device to resume its previously suspended transactions. If a device is found to be non-operational, the system instructs an alternative, operational device to resume the transactions that had been suspended on the original, non-operational device. In some embodiments, the process may involve assessing the operational status of other transaction processing devices at the enterprise site or, if preferred, evaluating devices at another site. Upon identifying a suitable alternative device, the system may coordinate the transfer of transaction data from the original device (or from a central database) to the alternative one. Following that, the system may instruct the resumption of the suspended transactions on the alternative device. In some embodiments, after determining which device will resume a suspended transaction, the emergency response system may generate a notification for the respective customer. The notification informs the customer of the alternative device available to complete his or her transaction. In some embodiments, the notification may include various forms, such as phone calls, emails, text messages, push notifications, and the like.

The disclosed system, which involves the technical implementation of emergency detection mechanisms, transaction data preservation, and dynamic reallocation of transaction resumption tasks, facilitates a streamlined and automated structure that enables transaction processing devices to respond to emergencies efficiently with reduced manual intervention. As a result, the system ensures a swift and coordinated handling of transaction processing in retail settings upon and after the occurrence of an emergency.

FIG. 1 depicts an example environment 100 for enhanced emergency response, according to some embodiments of the present disclosure.

In some embodiments, the environment 100 for enhanced emergency response may correspond to an enterprise site, such as a retail establishment. In some embodiments, the environment 100 may include one or more transaction processing devices. As used herein, "transaction processing devices" may refer to systems or devices used to conduct and manage checkout transactions and customer interactions. In retail environments, as illustrated, the transaction processing devices may refer to POS devices, such as staffed checkout devices 115-1 and 115-2, self-checkout devices 120-1 and 120-2, and self-service kiosks 105-1 and 105-2. The staffed checkout devices 115 may refer to conventional checkout counters where a store employee assists customers with their purchases. In some embodiments, a staffed checkout device 115 may include a screen (for displaying transaction details), a cash register, a barcode scanner, a scale, a receipt printer, and a payment terminal (e.g., a card reader) (for processing electronic payments). The staffed checkout devices 115 are designed to facilitate a smooth transaction process, assisted by store personnel. The self-checkout devices 120 may refer to automated (or semi-automated) stations where customers can complete their purchase transactions independently without human assistance (or with reduced human assistance). In some embodiments, a self-checkout device 120 may include a screen (for interacting with the POS system), a barcode scanner (for scanning items), a scale (for weighting items), a receipt printer, and a payment terminal (for processing electronic payment). The self-service kiosks 105 may refer to stations that are configured for certain functions that customers may utilize independently without human assistance (or with reduced human assistance), such as looking up information, ordering out-of-stock products, or processing returns. In some embodiments, a self-service kiosk 105 may include a screen (for user interaction), a built-in payment terminal (for processing electronic payment), a scanner for barcodes or QR codes, and a receipt printer.

In the illustrated example, the staffed checkout devices 115, the self-checkout devices 120, and the self-service kiosks 105 are interconnected and communicate with each other via a network 130. Additionally, as illustrated, each of these devices connects to a central server 135 and/or a database 125 via the network 130, to facilitate an efficient data preservation and emergency response system. The network 130 may include or correspond to a wide area network (WAN), a local area network (LAN), the Internet, an intranet, or any combination of suitable communication mediums that may be available, and may include wired, wireless, or a combination of wired and wireless links. In some embodiments, the staffed checkout devices 115, the self-checkout devices 120, and the self-service kiosks 105, the central server 135, and the database 125 may be local to each other (e.g., within the same local network and/or the same hardware system), and communicate with one another using any appropriate local communication medium, such as a local area network (LAN) (including a wireless local area network (WLAN)), hardwire, wireless link, or intranet, etc.

In the illustrated example, during normal operating hours, each transaction processing device (also referred to in some embodiments as POS device) (e.g., the staffed checkout devices 115, the self-checkout devices 120, and the self-service kiosks 105) within the retail establishment (e.g., a grocery store) assists a customer 110 in completing various transactions. These transactions may range from completing checkout at staffed and/or self-checkout devices to performing product searches, placing orders, or processing returns at self-service kiosks. For example, the customer 110-1 is waiting for a store employee to complete his or her purchase using the staffed checkout device 115-1. The checkout process may involve scanning items, bagging them, and processing payment. The customer 110-3 is using the self-checkout device 120-1 to independently complete his or her purchase, which may include scanning each item, bagging the items, and following on-screen instructions to complete the payment process (e.g., inserting a card or using a mobile payment option). Additionally, the customer 110-5 is at the self-service kiosk 105-1, and uses the device 105-1 to perform tasks without staff assistance, such as looking up information, placing an order, processing a return of a previously purchased item, and the like. In some embodiments, as customers 110 interact with these devices, the transaction data may be either saved locally on these devices, or transmitted to the central server 135 and saved in the database 125 for future reference and analysis.

In the illustrated example, when an emergency (e.g., a fire or smoke alarm being triggered) occurs, an emergency response process is initiated by the central server 135. The emergency response process may include transmitting an emergency alert to each transaction processing device, indicating the occurrence of the emergency, and/or instructing the devices to perform various protective actions. In some embodiments, the protective actions performed by the transaction processing devices may include, but are not limited to, locking down the devices to prevent new transactions, temporarily suspending transactions in progress, saving the suspended transactions locally or transmitting them to the central server 135 for centralized storage, displaying instructions or guidance to customers and staff (e.g., directions to the nearest exists or guidelines on how to stay safe during an emergency), and generating receipts for the suspended transactions.

In some embodiments, an emergency detection system may be installed at the retail establishment and communicate with the central server 135 via the network 130. In some embodiments, the emergency detection system may be configured to continuously monitor and identify potential emergencies within the premises. Upon detecting the occurrence of an emergency, the emergency detection system may transmit an activation signal to the central server 135 (e.g., through the network 130). The activation signal serves as a trigger for the central server 135, which subsequently initiates the emergency response process based on the received information.

In some embodiments, the emergency detection system may include various types of sensors, monitoring devices, or manual alarm interfaces configured to monitor emergencies within the retail establishment. For example, the emergency detection system may include automated sensors designed to detect fires, water or gas leaks, and the like. In some embodiments, the emergency detection system may include manual alarm interfaces (e.g., an emergency button) that enable store staff or customers to report emergency incidents, such as robbery, unauthorized access, natural disasters, medical emergencies, or other emergency situations. Upon these sensors detecting an emergency or the manual alarm interfaces receiving an input, the emergency detection system may transmit an alert (also referred to in some embodiments as an activation signal) to the central server 135, indicating the occurrence of an emergency. In some embodiments, the emergency detection system may transmit a deactivation signal to the central server 135 upon detecting that the emergency has been resolved. In some embodiments, the determination of resolution may involve a manual input from store personnel or security staff, who, after accessing the premises, confirm the end of the emergency and manually reset the system.

In the illustrated example, upon receiving the deactivating signal from the emergency system, the central server 135 initiates procedures to resume the transaction(s) that were suspended on each transaction processing device during the emergency. For example, in some embodiments, the central server 135 may transmit a request to each transaction processing device (e.g., the staffed checkout devices 115, the self-checkout devices 120, and the self-service kiosks 105), instructing it to perform diagnostic checks on its operational status. The checks may include various tests to determine whether a device is fully functional, and/or ready to resume operations. The operational status of a transaction processing device may be determined from various aspects, as discussed in more details below. If a transaction processing device (e.g., the self-checkout device 120-1) is determined to be operational—such that the components within a self-checkout device 120-1 like the barcode scanner, the payment terminal, and the printer, are working correctly and are able to complete checkout transaction(s)—the central server 135 may instruct the device (e.g., 120-1) to resume the previously suspended transaction(s). In some embodiments, the resume process may include retrieving the saved transaction data, either from the local storage or the central database 125, and reloading the transaction data onto the device when the customer (e.g., 110-3) returns. If the diagnostic check reveals that a transaction processing device (e.g., self-checkout device 120-1) is not operational—such that a printer within the self-checkout device 120-1 is malfunctioning, the scanner is unresponsive, or other connection issues—the central server 135 may check the status of other operational devices at the current retail establishment, such as the self-checkout device 120-2, the staffed checkout devices 115-1 and 115-2, and the self-service kiosks 105-1 and 105-2. If none of these devices on the premises are operational, the central server may check the status of devices at another site (e.g., a retail store nearby). Once an alternative device (e.g., self-checkout device 120-2) is identified, the central server 135 may facilitate the data transfer of the suspended transactions from the original, non-operational device (if the transaction data is saved locally) or from the central database 125 (if the transaction data is stored centrally) to the alterative, operational device. Following the data transfer, the suspended transaction(s) (e.g., for customer 110-3) are resumed on the alternative device (e.g., self-checkout device 120-2).

In some embodiments, the resume process (either on the original device or the alternative device) may ensure that the transactions are continued from where they were suspended, and may provide a smooth and efficient experience for customers who intend to complete their transactions after the emergency situation is resolved.

Figure 2:
FIG. 2 is a diagram depicting a sequence for enhanced emergency response, according to some embodiments of the present disclosure.

FIG. 2 is a diagram 200 depicting a sequence for enhanced emergency response, according to some embodiments of the present disclosure.

In the illustration, the emergency detection system 205, the emergency response system 210, and the POS devices 215 (also referred to in some embodiments as transaction processing devices) (e.g., the staffed checkout devices 115, the self-checkout devices 120, and the self-service kiosks 105 of FIG. 1) are interconnected and communicate with each other to manage emergencies within an area or environment (e.g., a retail establishment).

In some embodiments, the emergency detection system 205 may incorporate a range of sensors (or monitoring devices) configured to detect signs of potential emergencies within an area or environment (e.g., the retail establishment 100 as depicted in FIG. 1). The emergencies may include fires, gas or water leaks, natural disasters, medical emergencies, unauthorized access, robbery, and the like. When such incidents are detected, the emergency detection system 205 triggers an alert 220 (also referred to in some embodiments as an activation signal), and transmits the alert 220 to the emergency response system 210. In some embodiments, the alert 220 may indicate the nature of the emergency detected and/or other relevant information, such as the approximate location and severity level of the detected emergency, or the time when the emergency was detected.

In the illustrated example, upon receiving the alert 220 from the emergency detection system 205, the emergency response system 210 is activated. In some embodiments, the emergency response system 210 may include computing devices (e.g., the server 135 of FIG. 1) and software protocols that manage the response of the POS devices to an emergency. As illustrated, following the receipt of the activation signal 220 (indicating the occurrence of an emergency), the emergency response system 210 sends an emergency alert 225 to each POS device 215 within the area or environment monitored by the emergency detection system 205 (e.g., the retail establishment 100 as depicted in FIG. 1). In some embodiments, the emergency alert 225 may notify each POS device 215 of the occurrence of an emergency, and/or provide detailed information about the nature, location, time, or severity level of the incident. In some embodiments, the emergency alert 225 may include instruction(s) that guide the POS devices 215 to execute predefined protective actions 230 in response to the emergency. In some embodiments, these protective actions may be pre-programmed and automatically triggered upon the receipt of the emergency alert 225. In some embodiments, the protective actions may include, but are not limited to, locking down the POS devices to prevent new transactions, suspending any in-progress transactions, securely preserving related transaction data (either by saving the data locally or transmitting it to a central database), displaying emergency messages and guidance to customers, and printing receipts for the suspended transaction as a record.

In the illustrated example, after one or more of these protective actions 230 have been fully implemented, the POS devices may optionally generate and transmit a response 235 (indicated by a dashed arrow) to the emergency response system 210. The response may confirm the successful implementation of the instructed protective actions. The feedback mechanism may provide the emergency response system 210 to accurately monitor the status of each POS device 215 within the environment.

In the illustrated example, after transmitting the emergency alert 225 to the POS devices 215, the emergency response system 210 continues to monitor the environment (e.g., the retail establishment) by actively listening for signals from the emergency detection system 205. The continuous monitoring mechanism guarantees prompt detection of any changes or developments in the ongoing emergency. Once the emergency has been resolved, the emergency detection system transmits a deactivation signal 240 to the emergency response system 210. Upon receiving the signal 240, the emergency response system 210 transmits a status verification request 245 to each POS device within the area or environment. In some embodiments, the request 245 may prompt each POS device 215 to perform diagnostic checks on its operational status. In some embodiments, the diagnostic checks may include, but are not limited to, examining the status of each hardware component within a POS device (e.g., the barcode scanner, the receipt printer, and the payment terminal) to ensure it is functioning correctly, checking the POS device's network connectivity to a central server (e.g., the server 135 of FIG. 1), a database (e.g., the database 125 of FIG. 1), or other relevant network infrastructure, and verifying the software integrity and accessibility of the POS device to ensure the effective completeness of checkout or other services.

In the illustrated example, after these diagnostic checks are completed, each POS device 215 transmits a response 250 to the emergency response system 210. Within the response 250, each POS device 215 may report its operational status and/or any relevant data. For example, in some embodiments, a POS device 215 may report that every component is functional correctly and it is ready to resume standard operations. In some embodiments, the response 250 may indicate that a POS device is not functioning correctly, and/or identify potential issues, such as malfunctioning printers or network connection errors. The information provided in the response 250 about each device's operational status may then be used by the emergency response system 210 to effectively coordinate data transfer and/or facilitate an efficient and smooth recovery of suspended transactions.

In some embodiments, the recovery process can occur either on the original device or, if preferred, on an alternative POS device (located within or outside of the current site or environment). For example, if the response 250 from a POS device 215 indicates that it is operational—such that each component like barcode scanner, printer, or payment terminal is working correctly, there are no network connectivity issues, and the software is not compromised—the emergency response system 210 transmits a follow-up instruction 255 to the original POS device 215, directing it to resume the previously suspended transaction(s). In some embodiments, the resume process may involve retrieving the saved transaction data, either from the local storage or the central database (e.g., 125 of FIG. 1), and reloading the transaction data onto the device when the customer (e.g., 110 of FIG. 1) returns. If the response 250 from a POS device 215 indicates that it is not operational—such that a component within the device is malfunctioning, there are network connection errors, or software is compromised and not running correctly—the emergency response system 210 proceeds to identify alternative devices that can take over the transaction processing. In some embodiments, the identification process may involve analyzing the responses from other devices within the environment. If none of the POS devices within the affected retail environment are operational, the emergency response system 210 may extend its search for alternative devices to a nearby retail establishment (e.g., a nearby store or a branch of the same retail chain located close to the one where the emergency occurred). Once an alternative device is identified (either within or outside of the current site), the emergency response system 210 transmits a follow-up instruction 255 to the original, non-operational POS device 215, instructing it to transmit any saved transaction data to the alternative device. Subsequently, the emergency response system 210 sends another instruction to the alternative device, directing it to resume the suspended transactions. In some embodiments, such as when transaction data is centrally stored in a database (e.g., 125 of FIG. 1), the emergency response system 210, upon identifying an alternative device, may issue an instruction directly to the central database. The instruction may request that the central database sends the corresponding transaction data to the identified alternative POS device. This process of data transfer and coordination may ensure that the transition is efficient and smooth, and that customer transactions can be recovered without significant delay or inconvenience.

Figure 6:
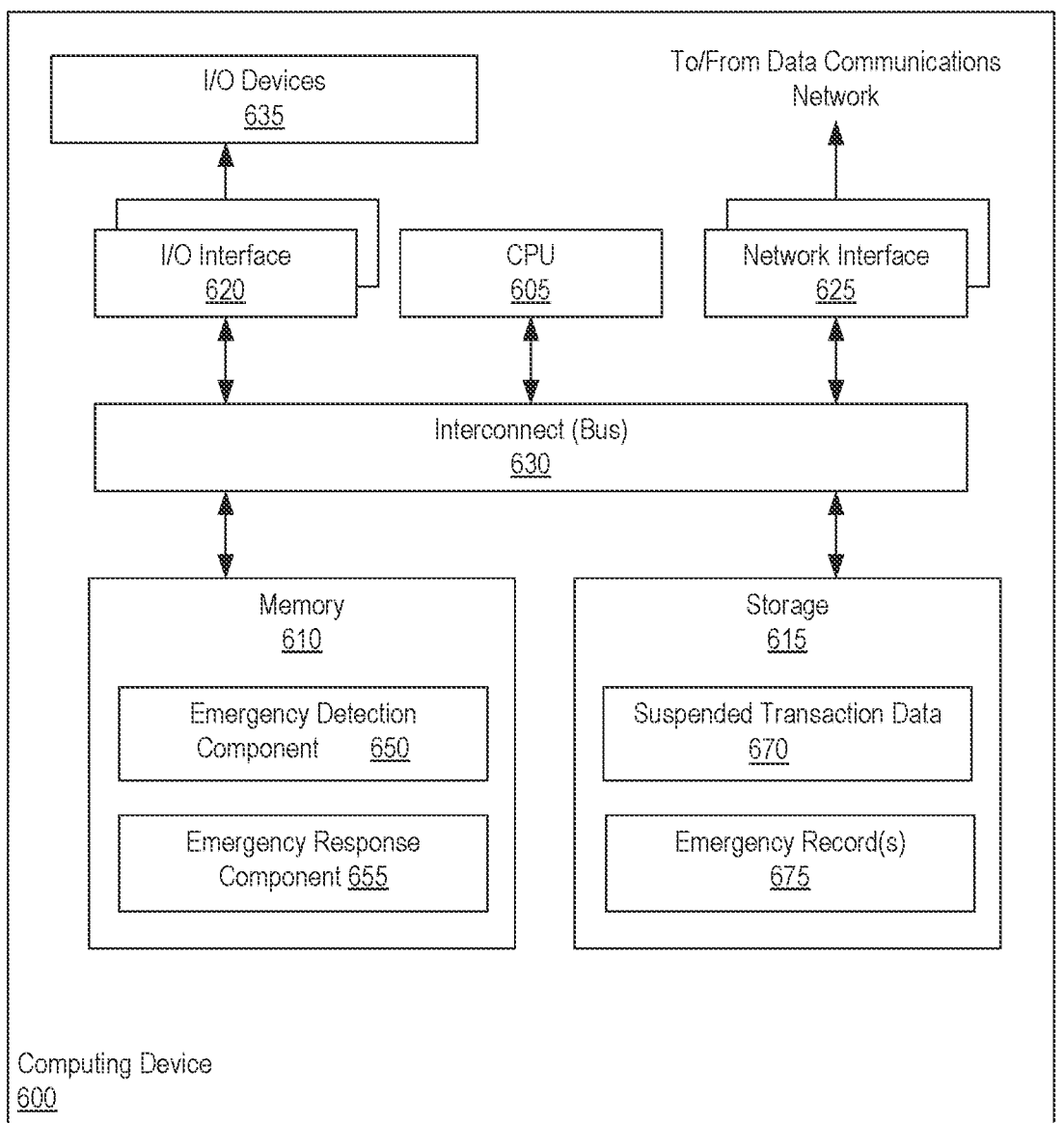
FIG. 6 depicts an example computing device configured to perform various aspects of the present disclosure, according to some embodiments of the present disclosure.

In some embodiments, the emergency detection system 205 and/or the emergency response system 210 may be implemented using one or more computing devices, such as the server 135 as illustrated in FIG. 1, or the computing device 600 as illustrated in FIG. 6. In some embodiments, multiple computing devices (e.g., the server 135 of FIG. 1)

may be connected together to handle different tasks initiated by the emergency detection system 205 and/or the emergency response system 210. The multi-device approach may provide scalable and flexible configurations that can adapt to the varying needs of the environment.

Figure 3:
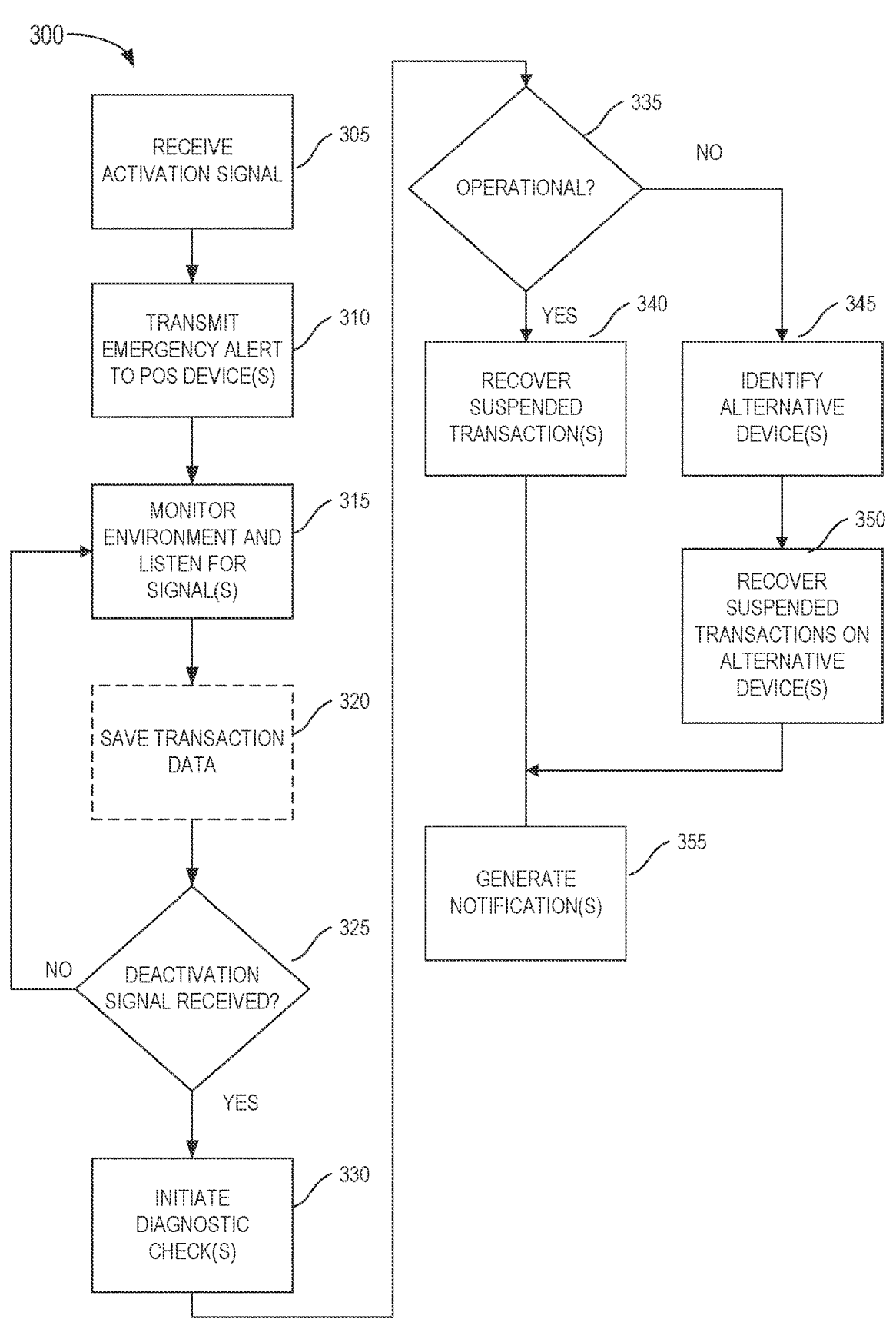
FIG. 3 depicts an example method for coordinating emergency responses between POS devices when an emergency occurs, according to some embodiments of the present disclosure.

FIG. 3 depicts an example method 300 for coordinating emergency responses between POS devices when an emergency occurs, according to some embodiments of the present disclosure. In some embodiments, the method 300 may be performed by one or more computing systems or devices, such as the server 135 as illustrated in FIG. 1, the emergency response system 210 as illustrated in FIG. 2, and/or the computing device 600 as illustrated in FIG. 6.

The method 300 begins at block 305, where a computing system (e.g., the server 135 of FIG. 1) receives an activation signal (e.g., 220 of FIG. 2), which indicates an emergency occurred at a physical site (e.g., a retail establishment). The emergency may include events like fires, gas leaks, water leaks, robbery, natural disasters, or other types of incidents that pose threats to the safety of humans at the physical site. In some embodiments, the activation signal is sent by an emergency detection system (e.g., 205 of FIG. 2), which is installed at the physical site, and/or configured to monitor the site's security and identify emergencies as they occur. In some embodiments, the emergency detection system may include various sensors or monitoring devices, each configured to detect distinct types of emergencies. For example, smoke detectors may be used to identify fires or smokes, motion sensors may be used to detect unauthorized intrusions, and gas detectors may be used for sensing gas leaks. In addition to or instead of using these automated sensors, the emergency detection system may also incorporate manual alarm interfaces, which allow staff or customers at the site to manually report emergencies.

Upon receiving the activation signal, the computing system initiates the emergency response actions to suspend ongoing transactions and preserve relevant data. At block 305, the computing system transmits an emergency alert (e.g., 225 of FIG. 2) to each POS device (also referred to in some embodiments as transaction processing devices) located at the physical site (e.g., the staffed checkout devices 115-1 and 115-2, the self-checkout devices 120-1 and 120-2, and self-service kiosks 105-1 and 105-2 as illustrated in FIG. 1, the POS device 215 as illustrated in FIG. 2). As discussed above, in some embodiments, the emergency alert may indicate the occurrence of an emergency, and/or provide detailed information about the nature, location, time, or severity level of the emergency. In some embodiments, the emergency alert may include instruction(s) that direct the POS devices to implement predefined protective actions in response to the emergency. The protective actions executed by the POS devices may vary depending on the nature of the emergency and the configurations of the POS system, and may include, but are not limited to, locking down the POS devices to prevent new transactions, temporarily halting any transactions in progress, utilizing the screens of the POS devices to display emergency instructions or directions (e.g., evacuation routes, safety measures), and securely saving transaction data (either locally or by transmitting to a central database). In some embodiments, the emergency alert may be sent to each POS device through API calls.

At block 315, the computing system actively monitors the environment of the site and/or listens for further signals from the emergency detection system to track any changes or developments of the detected emergency.

In embodiments where the POS devices, in response to the emergency alert, decide to save the transaction data in a central database (e.g., 125 of FIG. 1), the process may involve an initial transmission of the data to the computing system for compiling and aggregation. This step may provide that the transaction data from each POS device at the physical site is processed in a coordinated and efficient manner. Upon receiving the transaction data from each POS device, at block 320, the computing system may aggregate the data to create a dataset, and transmit it to a central database (e.g., 125 of FIG. 1) for storage. In some embodiments, during the transmission from the computing system to the central database, the computing system may encrypt the data (e.g., by using secure transmission protocols) to protect it from potential threats or corruption.

At block 320, the computing system determines whether a deactivation signal (e.g., 240 of FIG. 2) has been received. The deactivation signal may be received from the emergency detection system (e.g., 205 of FIG. 2), and indicate that the detected emergency at the physical site has been resolved, and/or the situation is under control. If the computing system receives a deactivation signal, the method 300 proceeds to block 325, where the computing system initiates diagnostic checks on each POS device. If no deactivation signal has been received, the method 300 returns to block 315, where the computing system continues to monitor the environment and listen for any further signals from the emergency detection system.

At block 330, the computing system initiates diagnostic checks on each POS device (e.g., by transmitting a status verification request 245 to the POS device 215, as illustrated in FIG. 2). The diagnostic checks are designed to determine if each POS device is functioning correctly and/or is ready to resume normal operations. In some embodiments, the diagnostic checks initiated by the computing system on each POS device may include a thorough examination of both hardware and software components to ensure they are functioning correctly. These checks may further include verifying that each POS device is properly connected to the network and can communicate with the computing system or other systems for synchronized operations and data management.

At block 335, based on the diagnostic response (or reports) (e.g., 250 of FIG. 2) sent by each POS device, the computing system determines whether each device is operational. In some embodiments, the response may include a determination made by the POS device based on its checks, reporting whether it is functioning correctly. In some embodiments, the response may provide detailed information about certain aspects of the device's functionality, such as hardware component functionality, software component integrity, and network connectivity. In some embodiments, a POS device may be considered operational if both its hardware components (e.g., printers, barcode scanners, or payment terminals) and software components (e.g., operation system, or checkout applications) are functioning correctly, and its network connection is stable and secure. If any issues are detected in any of these areas, such that a printer is malfunctioning or there are network errors, the device may be considered non-operational.

If the POS device is determined to be operational, the method 300 proceeds to block 340, where the computing system instructs it to recover its previously suspended transaction(s). The recovery process may include retrieving the transaction data from its local storage or from a central database, and reloading the data on the device when the customer returns. If the POS device is found to be non-operational, the method 300 moves to block 345, where the computing system proceeds to identify an alternative device.

The identification process may begin by examining other POS devices within the same site. If none of the POs devices at the current site are found to be operational, the evaluation extends to POS devices outside the site (e.g., POS devices located in nearby retail sites close to the one where an emergency occurred). After an alternative, operational POS device is identified, the method 300 moves to block 350, where the computing system coordinates data transfer and recovers the suspended transactions. The data transfer may occur directly from the original, non-operational POS device or from the central database, depending on where the transaction data was saved. Following the data transfer, the computing system then sends instructions to the alternative device, directing it to recover the transactions previously suspended on the original POS device.

At block 355, the computing system communicates with customers whose transactions were suspended during the emergency. For example, the computing system generates notifications to these customers, informing them about the status of their transactions, and/or instructing them on how to complete these suspended transactions. The notifications may include various forms, depending on the customers' preferences and the available contact information. The notifications may include emails, push notifications (on a mobile application), text messages, and phone calls. In some embodiments, the notification may include clear guidance on where and how customers can complete their transactions, such as visiting a POS device within the site at a later time, visiting a POS device at a nearby site, or completing the transaction online. To send these notifications, the computing system may retrieve the customers' contact information associated with each suspended transaction from various sources. This may include the customer's loyalty account, previous registration records, or contact information the customer entered during the transaction process. By providing timely and clear communications to customers, the computing system may mitigate any inconvenience caused by the emergency at the site, and maintain a positive relationship with the customers.

Figure 4:
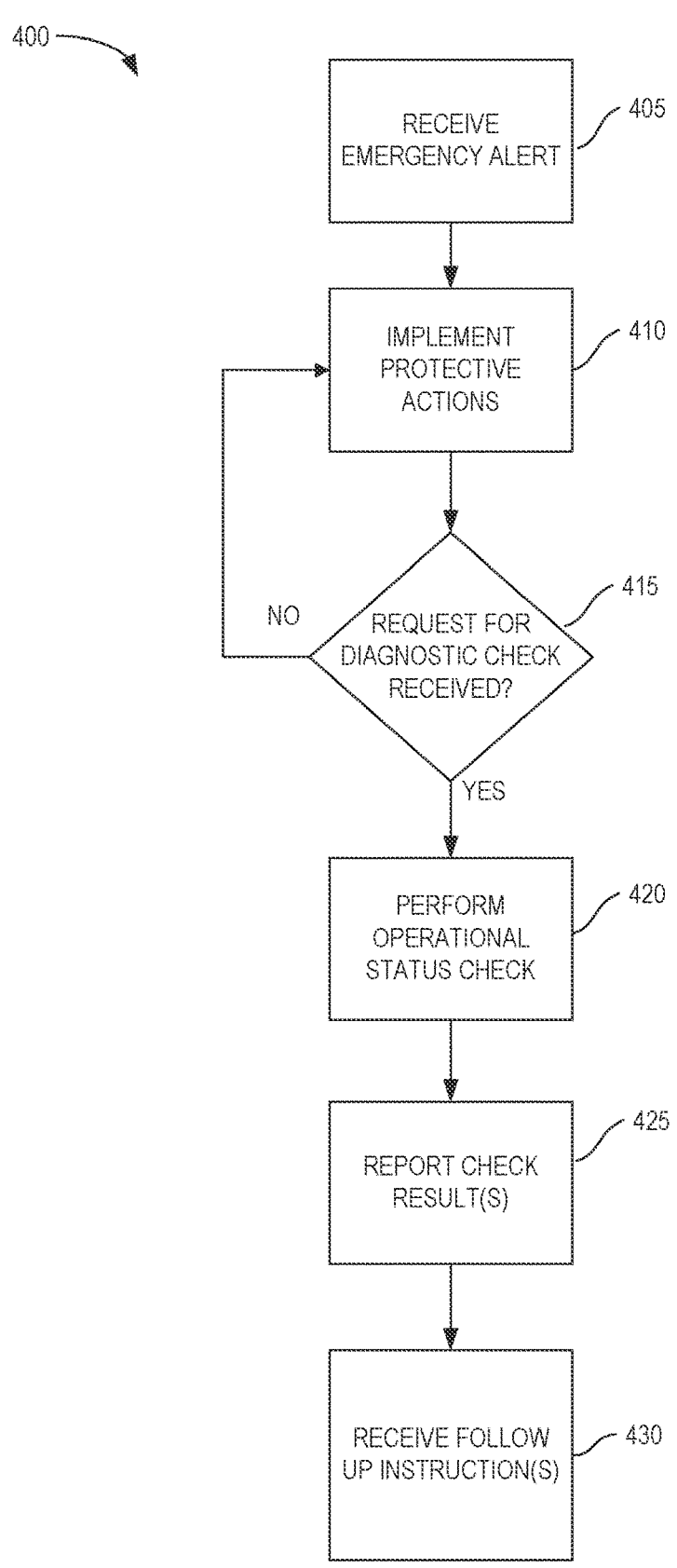
FIG. 4 depicts an example method for suspending and preserving transaction data by POS devices in response to received emergency alerts, according to some embodiments of the present disclosure.

FIG. 4 depicts an example method 400 for suspending and preserving transaction data by POS devices in response to received emergency alerts, according to some embodiments of the present disclosure. In some embodiments, the method 400 may be performed by one or more computing devices or systems, such as the staffed checkout devices 115-1 and 115-2, the self-checkout devices 120-1 and 120-2, and self-service kiosks 105-1 and 105-2 as illustrated in FIG. 1, and/or the POS device 215 as illustrated in FIG. 2.

At block 405, a POS device (also referred to in some embodiments as a transaction processing device) (e.g., the self-checkout device 120-1 of FIG. 1) receives an emergency alert (e.g., 225 of FIG. 2). The emergency alert may be transmitted by an emergency response system (e.g., 210 of FIG. 2), and indicate an emergency situation arises at the site (e.g., a retail establishment) where the POS device is located. In some embodiments, the alert may contain detailed information about the detected emergency, such as the type of emergency (e.g., fires, gas leaks, and the like), its location, time, and severity levels. In some embodiments, the alert may include instructions that trigger the POS device to perform certain pre-defined protective actions.

At block 410, in response to the emergency alert, the POS device implements protective actions that are designed to protect customers and staff and secure transaction data during the emergency. In some embodiments, the protective actions may be pre-programmed on the POS device, and automatically triggered upon the receipt of the emergency alert. The protective actions taken by the POS device may include locking down the device to prevent new transactions from being initiated, directing staff and customers to focus on the present emergency. In some embodiments, the actions may extend to temporarily halting the ongoing transactions at the time the emergency alert was received, and/or securely preserving the corresponding transaction data. Depending on the system configuration, the POS device may save the transaction data locally or transmit it to a database for centralized storage. In some embodiments, the actions may further include displaying emergency messages or instructions on the POS device's screen, and/or printing receipts for these suspended transactions. In some embodiments, the emergency messages displayed by the POS device may include routes for safe evacuation and/or locations of emergency exits at the current site. In some embodiments, the printed receipts for these suspended transactions may serve as physical records, and be used by customers or staff to resume or verify these transactions after the emergency situation has been resolved.

At block 415, the POS device determines whether a request for diagnostic checks (e.g., 245 of FIG. 2) has been received. The request may be transmitted by an emergency response system (e.g., 210 of FIG. 2) once it determines that the detected emergency at the site has been resolved. If the POS device receives the request, the method 400 proceeds to block 420, where the POS device performs an assessment of its operational status. The checks may include a thorough examination of various aspects of the device. For example, the checks may involve examining each of the POS device's hardware components, such as the barcode scanners, the receipt printers, the payment terminals, and other peripheral parts, to ensure each of the components is working correctly. In some embodiments, the checks may involve ensuring these hardware components are free of physical damages, malfunctions, or performance issues that could hinder the device's capability to carry out the transactions. In some embodiments, the software of the POS device, such as its operating system, transaction processing applications, or other relevant software, may also be evaluated to ensure there are no software errors, corruption, or glitches. The checks may also include identifying any signs of unauthorized access or security breaches that may compromise its functionality. In some embodiments, the network connection of the POS device may also be verified to ensure that it is stable and secure, and that the device can communicate with the central server, the database, or other systems or devices efficiently without interruption. If the request has not been received by the POS device, the method 400 returns to block 410, where the POS device maintains its emergency mode, and listens for further requests.

After completing the operational status checks, at block 425, the POS transmits a response (e.g., 250 of FIG. 2) back to the emergency response system, reporting the results of the checks and/or its post-emergency status. In some embodiments, the response may include a self-determination made by the POS device based on its checks, indicating whether it is functioning correctly and ready to resume normal operations. In some embodiments, the response may provide detailed information about the check results. For example, the response may report on the operational status of each hardware component, detail any software-related issues, and/or confirm the stability and security of the device's network connection. Based on the response, in some embodiments, the emergency response system may assess whether the POS device is operational. Relying on the assessment, the emergency response may issue corresponding follow-up instructions.

At 430, the POS device receives follow-up instructions from the emergency response system. If the POS devices is determined to be operational, the instructions may guide the POS device to retrieve the transaction data (either from its local storage or from a central database), and/or resume the previously suspended transactions. If the POS device is determined to be non-operational, the instructions may direct the POS device to transmit its locally saved transaction data to an alternative, operational device (either within or outside of the current site). In some embodiments where the transaction data is centrally stored in a database (e.g., 125 of FIG. 1) during the emergency, if the POS device is found to be non-operational, the non-operational POS device may not receive any follow-up instructions regarding data transfer. Instead, the emergency response system may directly communicate with the central database, instructing the database to send the corresponding transaction data to the identified, alternative POS device.

FIG. 5 is a flow diagram depicting an example method 500 for transaction suspension and data preservation, according to some embodiments of the present disclosure.

At block 505, a computing system (e.g., the server 135 as illustrated in FIG. 1, or the emergency response system 210 as illustrated in FIG. 2) receives an activation signal indicating an event occurred at a first location.

At block 510, the computing system transmits an alert to a set of transaction processing devices at the first location, where the alert instructs each respective transaction processing device, from the set of transaction processing devices, to suspend respective transactions that are pending for completion. In some embodiments, the alert may instruct each respective transaction processing device, from the set of transaction processing devices, to at least further (i) store the respective suspended transactions locally, (ii) transmit the respective suspended transactions to a central database for storage, or (iii) print respective suspended receipts to provide tangible evidence of the respective suspended transactions.

At block 515, the computing system receives a deactivation signal indicating the event was resolved.

At block 520, responsive to receiving the deactivation signal, the computing system conducts diagnostic checks on each of the set of transaction processing devices to determine operational status. In some embodiments, at least one of the activation signal and deactivation signal may be triggered by an event detection mechanism at the physical location, and the event detection mechanism may comprise a set of sensors designed to detect different types of events.

At block 525, the computing system determines a transaction processing device, from the set of transaction processing devices, is operational.

At block 530, responsive to determining the transaction processing device is operational, the computing system instructs the transaction processing device to resume the respective transactions suspended on the transaction processing device.

In some embodiments, upon determining a second transaction processing device, from the set of transaction processing devices, is not operational, the computing system may identify an alternative transaction processing device, and instruct the alternative transaction processing device to resume the respective transactions suspended on the second transaction processing device. In some embodiments, the alternative transaction processing device may comprise at least one of (i) a third transaction processing device, from the set of transaction processing devices at the first location, or (ii) a fourth transaction processing device at a second location.

In some embodiments, the computing system may further receive transaction data from each of the set of transaction processing devices, and store the received transaction data in a database.

In some embodiments, the computing system may further generate notifications for completing the respective transactions suspended on each respective transaction processing device. In some embodiments, the notifications may comprise at least one of an email, a text message, a phone call, or a push notification, and the notifications may be transmitted to one or more customer devices via a network connection.

FIG. 6 depicts an example computing device 600 configured to perform various aspects of the present disclosure, according to some embodiments of the present disclosure. Although depicted as a physical device, in some embodiments, the computing device 600 may be implemented using virtual device(s), and/or across a number of devices (e.g., in a cloud environment). The computing device 600 can be embodied as any computing device or system, such as the server 135 as illustrated in FIG. 1, the emergency detection system 205, and the emergency response system as illustrated in FIG. 2.

As illustrated, the computing device 600 includes a CPU 605, memory 610, storage 615, one or more network interfaces 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally considered to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes an emergency detection component 650 and an emergency response component 655. Although depicted as a discrete component for conceptual clarity, in some embodiments, the operations of the depicted component (and others not illustrated) may be combined or distributed across any number of components. Further, although depicted as software residing in memory 610, in some embodiments, the operations of the depicted components (and others not illustrated) may be implemented using hardware, software, or a combination of hardware and software.

In the illustrated embodiment, the emergency detection component 650 (which may correspond to the emergency detection system 205 of FIG. 2) is configured to monitor an area or environment, such as a retail establishment (e.g., 10 of FIG. 1), for signs of potential emergencies. This may include monitoring for a wide range of incidents, such as fires, gas or water leaks, natural disasters, and other threats. The emergency detection component 650 may utilize various sensors, monitoring devices, or manual alarm interfaces to identify emergencies. Upon detecting an emergency, the emergency detection component 650 may generate an alert (also referred to in some embodiments as an activation signal) (e.g., 225 of FIG. 2), and transmit the alert to the emergency response component 655 or other related components or systems. In some embodiments, the alert may indicate the occurrence of an emergency, and may contain information about the nature, location, time or severity of the emergency. In some embodiments, the alert may activate the emergency response component 655 to initiate and coordinate responses to the emergency.

In the illustrated embodiment, the emergency response component 655 (which may correspond to the emergency response system 210 of FIG. 2) is configured to initiate protective actions on transaction processing devices during an emergency, and to coordinate the recovery of the suspended transactions on these devices post-emergency. In some embodiments, the emergency response component 655, upon receiving the alert from the emergency detection component 650, may transmit it to the transaction processing devices (also referred to in some embodiments as POS devices) within the same site, and instruct these devices to implement appropriate protective actions during the emergency. The protective actions may include, but are not limited to, locking down these transaction processing devices to prevent new transactions, temporarily suspending transactions in progress, saving the suspended transactions locally or transmitting them to a central database, displaying instructions or guidance to customers and staff, and generating receipts for the suspended transactions. In some embodiments, after transmitting the instructions to the transaction processing devices, the emergency response component 655 may continue to monitor the environment by actively listening for further signals from the emergency detection component 650, and/or updating the transaction processing devices in real time. After the emergency has been resolved, the emergency response component 655 may receive a deactivation signal (e.g., 240 of FIG. 2) from the emergency detection component 650. Based on the signal, the emergency response component 655 may initiate the post-emergency recovery process. For example, in some embodiments, the emergency response component 655 may instruct each transaction processing device to perform diagnostic checks on its operational status. These checks may include, but are not limited to, confirming the functionality of software and hardware of the device, and verifying its network connection. Upon determining that a transaction process device is operational, the emergency response component 655 may instruct the device to resume the previously suspended transactions. This may involve retrieving the saved transaction data, either from local storage or a central database, and preparing the device to complete these transactions when the customer returns. If it is determined that a transaction processing device is not operational, the emergency response component 655 may analyze the check results of other devices to identify an alternative, operational device. Once such a device is identified, the emergency response component 655 may coordinate the transfer of transaction data from the original, non-operational device to the alternative device. The emergency response component 655 may then instruct the alternative device to resume the previously suspended transactions. In some embodiments, based on the post-emergency arrangement (e.g., determinations of which transaction processing device will resume a respective transaction), the emergency response component 655 may proceed to generate notifications for customers. These notifications may inform customers about the devices (or locations) they can use to complete their transactions after an emergency.

In the illustrated example, the storage 615 may include suspended transaction data 670 and emergency records 675. In some embodiments, the aforementioned data may be saved in a remote database (e.g., 125 of FIG. 1) that connects to the computing device 600 via a network (e.g., 130 of FIG. 1).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., emergency response application) or related data available in the cloud. For example, the emergency response application may perform data processing and generate corresponding instructions through a cloud computing infrastructure, and store the relevant results in a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:

receiving, from an alert sensor integrated into an alert device, an alert signal from the alert device situated at a first location;

responsive to receiving the alert signal from the alert device situated at the first location, generating an activation signal;

transmitting the activation signal to a set of transaction processing devices situated at the first location, wherein the activation signal comprises instructions to suspend respective transactions that are pending for completion;

responsive to receiving the activation signal at each respective transaction processing device in the set of transaction processing devices, causing each respective transaction processing device to disable the respective transaction pending for completion;

receiving from the alert sensor integrated into the alert device, a second alert signal from the alert device situated at the first location;

responsive to receiving the second alert signal from the alert device situated at the first location, generating a deactivation signal, and causing each respective transaction processing device in the set of transaction processing devices to execute a diagnostic system check on each of the set of transaction processing devices to determine operational status;

determining a transaction processing device, from the set of transaction processing devices, is operational;

responsive to determining the transaction processing device is operational, instructing the transaction processing device to resume the respective transactions suspended on the transaction processing device;

responsive to determining that the transaction processing device from the set of transaction processing devices is non-operational:

accessing a point-of-sale network in which the set of transaction processing devices are connected;

scanning the point-of-sale network for an alternative operational transaction processing device;

identifying the alternative operational transaction processing device different from the non-operational transaction processing device from the set of transaction processing devices;

causing a set of transaction data stored at the non-operational transaction processing device to transfer to the identified alternative operational transaction processing device; and causing the alternative operational transaction processing device to execute the transferred set of transaction data suspended on the non-operational transaction processing device.

2. The method of claim 1, wherein the alternative transaction processing device comprises at least one of (i) a third transaction processing device, from the set of transaction processing devices at the first location; or (ii) a fourth transaction processing device at a second location.

3. The method of claim 1, wherein the alert device comprises an event detection mechanism designed to detect different types of events.

4. The method of claim 1, wherein the alert signal comprises instructions for each respective transaction processing device, from the set of transaction processing devices, to at least further (i) store the respective suspended transactions locally; (ii) transmit the respective suspended transactions to a central database for storage; or (iii) print respective suspended receipts to provide tangible evidence of the respective suspended transactions.

5. The method of claim 1, further comprising:
receiving transaction data from each of the set of transaction processing devices; and
storing the received transaction data in a database.

6. The method of claim 1, further comprising generating notifications for completing the respective transactions suspended on each respective transaction processing device.

7. The method of claim 6, wherein the notifications comprise at least one of an email, a text message, a phone call, or a push notification, and wherein the notifications are transmitted to one or more customer devices via a network connection.

8. A system, comprising:
a processor;
a memory storing a program, which, when executed by the processor, performs operations, the operations comprising:
receiving, from an alert sensor integrated into an alert device, an alert signal from the alert device situated at a first location;
responsive to receiving the alert signal from the alert device situated at the first location, generating an activation signal;
transmitting the activation signal to a set of transaction processing devices situated at the first location, wherein the activation signal comprises instructions to suspend respective transactions that are pending for completion;
responsive to receiving the activation signal at each respective transaction processing device in the set of transaction processing devices, causing each respective transaction processing device to disable the respective transaction pending for completion;
receiving from the alert sensor integrated into the alert device, a second alert signal from the alert device situated at the first location;
responsive to receiving the second alert signal from the alert device situated at the first location, generating a deactivation signal, and causing each respective transaction processing device in the set of transaction processing devices to execute a diagnostic system check on each of the set of transaction processing devices to determine operational status;
determining a transaction processing device, from the set of transaction processing devices, is operational;
responsive to determining the transaction processing device is operational, instructing the transaction processing device to resume the respective transactions suspended on the transaction processing device;
responsive to determining that the transaction processing device from the set of transaction processing devices is non-operational:

accessing a point-of-sale network in which the set of transaction processing devices are connected;
scanning the point-of-sale network for an alternative operational transaction processing device;
identifying the alternative operational transaction processing device different from the non-operational transaction processing device from the set of transaction processing devices;
causing a set of transaction data stored at the non-operational transaction processing device to transfer to the identified alternative operational transaction processing device; and
causing the alternative operational transaction processing device to execute the transferred set of transaction data suspended on the non-operational transaction processing device.

9. The system of claim 8, wherein the alternative transaction processing device comprises at least one of (i) a third transaction processing device, from the set of transaction processing devices at the first location; or (ii) a fourth transaction processing device at a second location.

10. The system of claim 8, wherein the alert device comprises an event detection mechanism designed to detect different types of events.

11. The system of claim 8, wherein the alert signal comprises instructions for each respective transaction processing device, from the set of transaction processing devices, to at least further (i) store the respective suspended transactions locally; (ii) transmit the respective suspended transactions to a central database for storage; or (iii) print respective suspended receipts to provide tangible evidence of the respective suspended transactions.

12. The system of claim 8, wherein the program, when executed by the processor, performs the operations further comprising generating notifications for completing the respective transactions suspended on each respective transaction processing device.

13. The system of claim 12, wherein the notifications comprise at least one of an email, a text message, a phone call, or a push notification, and wherein the notifications are transmitted to one or more customer devices via a network connection.

14. One or more non-transitory computer-readable media containing, in any combination, computer program code that, when executed by operation of a computer system, performs operations comprising:
receiving, from an alert sensor integrated into an alert device, an alert signal from the alert device situated at a first location;
responsive to receiving the alert signal from the alert device situated at the first location, generating an activation signal;
transmitting the activation signal to a set of transaction processing devices situated at the first location, wherein the activation signal comprises instructions to suspend respective transactions that are pending for completion;
responsive to receiving the activation signal at each respective transaction processing device in the set of transaction processing devices, causing each respective transaction processing device to disable the respective transaction pending for completion;
receiving from the alert sensor integrated into the alert device, a second alert signal from the alert device situated at the first location;
responsive to receiving the second alert signal from the alert device situated at the first location, generating a deactivation signal, and causing each respective transaction processing device in the set of transaction processing devices to execute a diagnostic system check on each of the set of transaction processing devices to determine operational status;

determining a transaction processing device, from the set of transaction processing devices, is operational;

responsive to determining the transaction processing device is operational, instructing the transaction processing device to resume the respective transactions suspended on the transaction processing device;

responsive to determining that the transaction processing device from the set of transaction processing devices is non-operational:

accessing a point-of-sale network in which the set of transaction processing devices are connected;

scanning the point-of-sale network for an alternative operational transaction processing device;

identifying the alternative operational transaction processing device different from the non-operational transaction processing device from the set of transaction processing devices;

causing a set of transaction data stored at the non-operational transaction processing device to transfer to the identified alternative operational transaction processing device; and causing the alternative operational transaction processing device to execute the transferred set of transaction data suspended on the non-operational transaction processing device.

15. The one or more non-transitory computer-readable media of claim 14, wherein the alternative transaction processing device comprises at least one of (i) a third transaction processing device, from the set of transaction processing devices at the first location; or (ii) a fourth transaction processing device at a second location.

16. The one or more non-transitory computer-readable media of claim 14, wherein the alert signal comprises instructions for each respective transaction processing device, from the set of transaction processing devices, to at least further (i) store the respective suspended transactions locally; (ii) transmit the respective suspended transactions to a central database for storage; or (iii) print respective suspended receipts to provide tangible evidence of the respective suspended transactions.

17. The one or more non-transitory computer-readable media of claim 14, wherein the computer program code that, when executed by operation of a computer system, performs the operations further comprising:

receiving transaction data from each of the set of transaction processing devices; and storing the received transaction data in a database.

* * * * *